Jan. 8, 1924. 1,479,918
A. LLEO ET AL
MULTICYLINDER INTERNAL COMBUSTION ENGINE
Original Filed Jan. 5, 1920  3 Sheets-Sheet 1
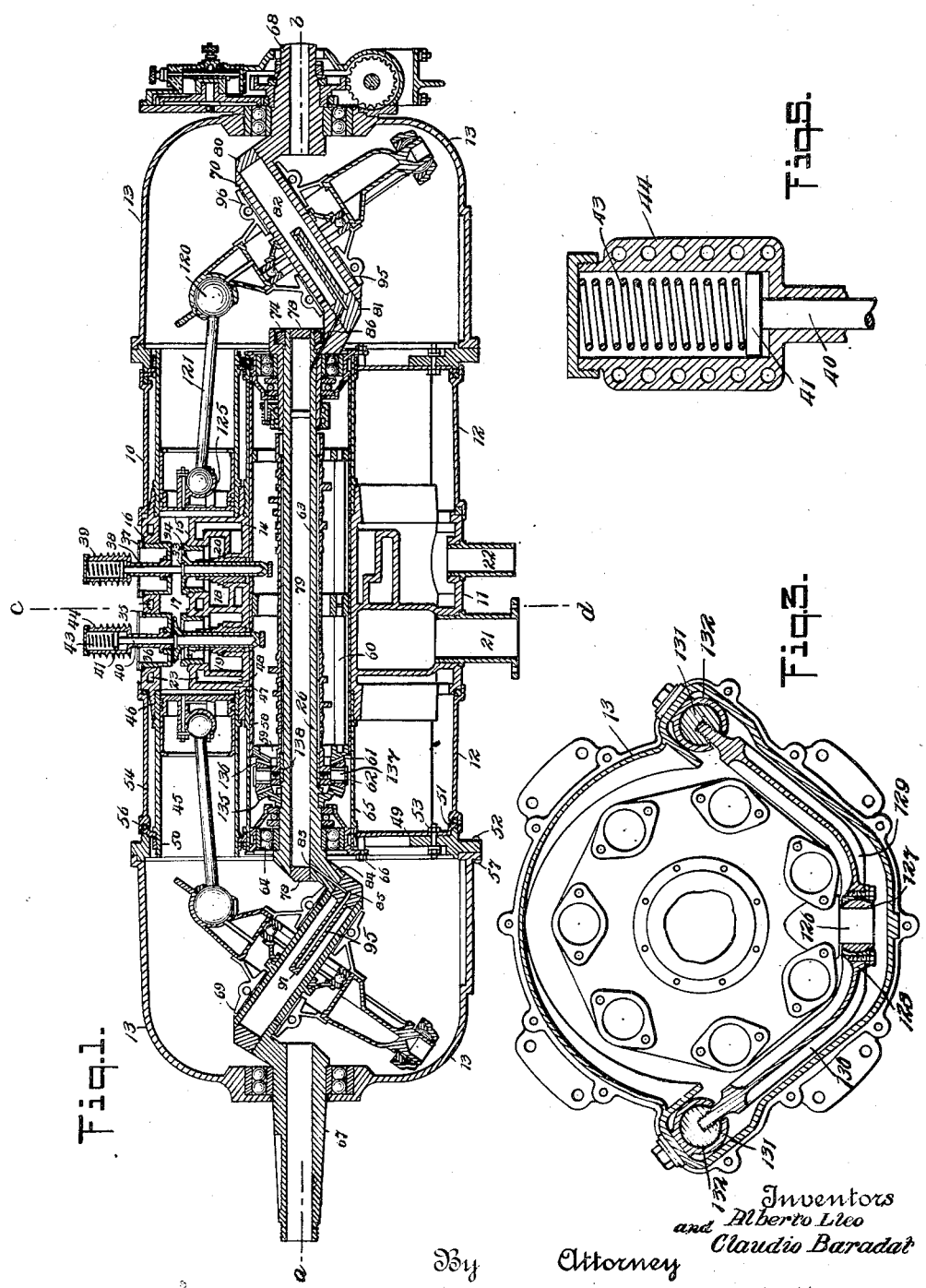
Inventors
Alberto Lleo
and Claudio Baradat
By Warren S. Orton
Attorney

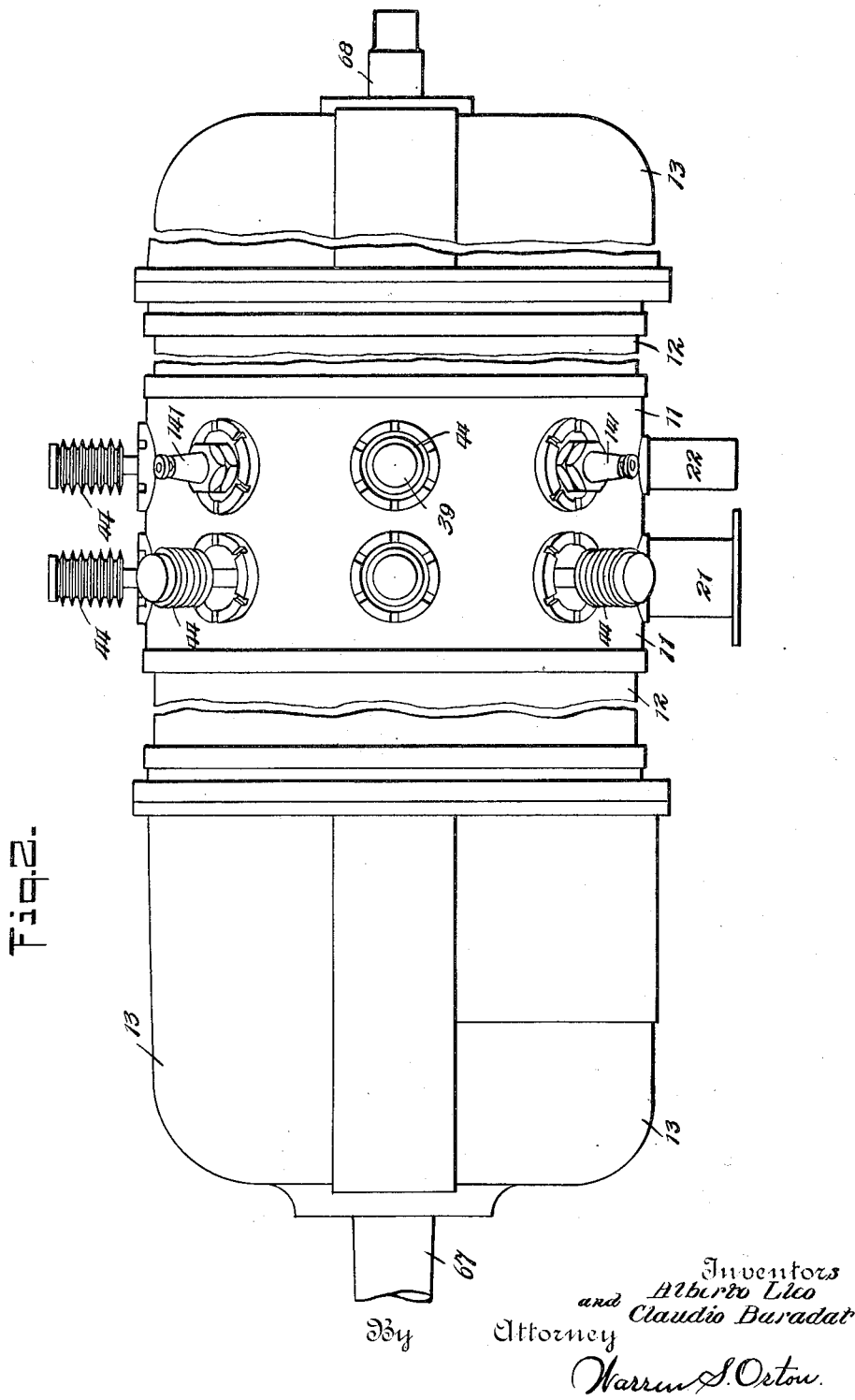

Jan. 8, 1924. 1,479,918
A. LLEO ET AL
MULTICYLINDER INTERNAL COMBUSTION ENGINE
Original Filed Jan. 5, 1920   3 Sheets-Sheet 3
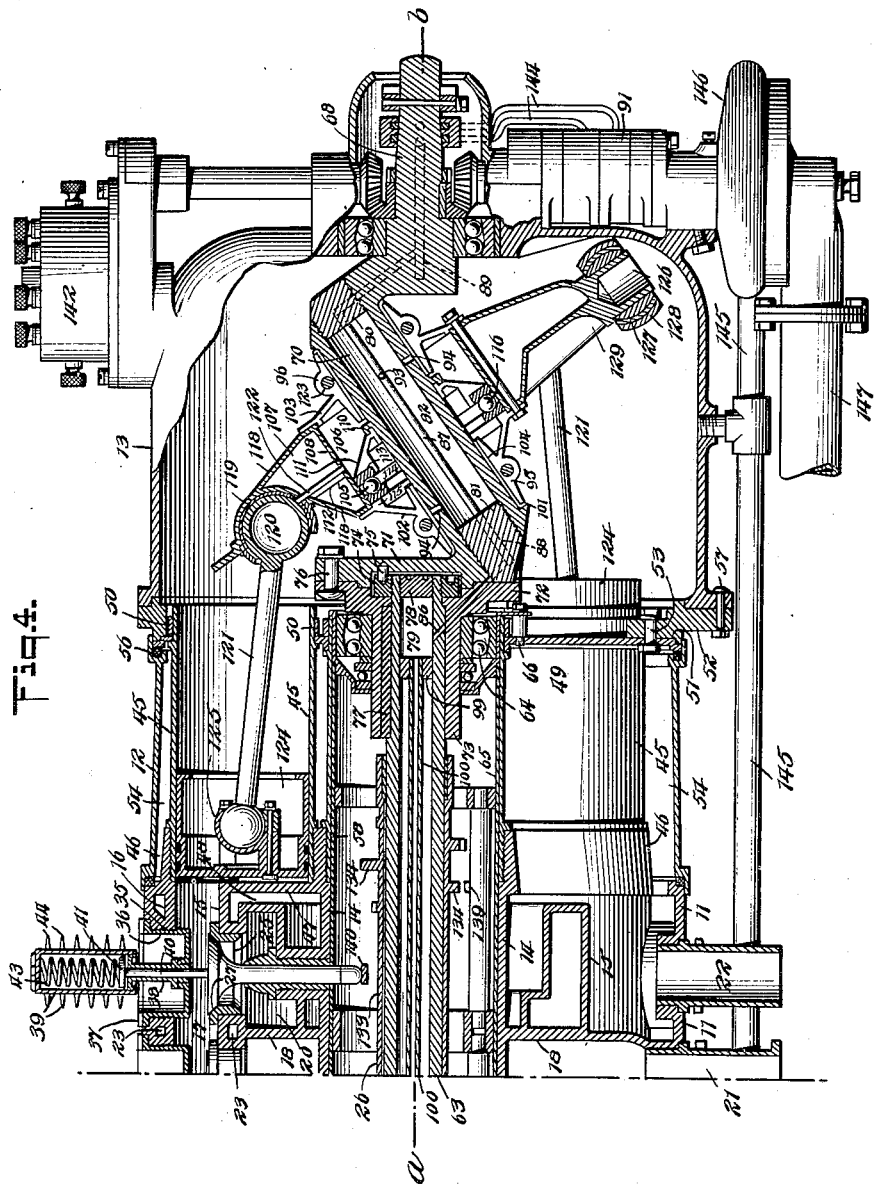
INVENTORS
Alberto Lleo
and Claudio Baradat
BY
Warren S. Orton
ATTORNEYS Patented Jan. 8, 1924.

1,479,918

UNITED STATES PATENT OFFICE.

ALBERTO LLEO AND CLAUDIO BARADAT, OF BARCELONA, SPAIN; SAID BARADAT ASSIGNOR TO SAID LLEO.

MULTICYLINDER INTERNAL-COMBUSTION ENGINE.

Application filed January 5, 1920, Serial No. 349,652. Renewed October 4, 1923.

*To all whom it may concern:*

Be it known that we, ALBERTO LLEO and CLAUDIO BARADAT, subjects of the King of Spain, and residents of Barcelona, Spain, have invented certain new and useful Improvements in Multicylinder Internal-Combustion Engines, of which the following is a specification.

The invention relates to certain improvements in four cycle internal combustion engines of the multi-cylinder, balance-piston type in which the parts are for the most part disposed symmetrically on opposite sides of a transverse medial plane and in which the sets of pistons on each side are connected through a wabble-plate mechanism to translate the reciprocatory movement of the pistons of the adjacent set into rotary movement of a centrally disposed driven shaft.

The present disclosure constitutes a development of the subject-matter contained in our Patents Nos. 1,355,484 and 1,355,485, dated October 12, 1920.

The primary object of the present invention is to provide a commercially perfected and simplified form of engine of the class described, which will develop relatively high horse power and at the same time will feature compactness of construction and a disposition of parts facilitating their confinement within a much smaller space than is usually occupied by engines of similar horse power.

Other objects incidental to this general desideratum is to provide for economy in the space utilized; the minimizing of the number of necessary parts and the corelation of these parts so as to utilize all of the space within the limited outlines of the engine.

Another object of the invention is to provide in such an engine a balanced organization of moving parts cooperatively functioning so that unusually high efficiency is obtained from the succeeding explosive charges and in which the power generated is transmitted into the rotary action of the driven shaft with minimum transmission losses.

Another general object of the invention is to provide a casing construction formed of parts which can be made up economically largely of castings and stampings, which will require the least possible machining or necessity for the construction of refined interfitting parts and which can be assembled and demounted rapidly with the use of a simple bolt wrench.

Accordingly, the invention features as part of a novel form of casing, a central, relatively heavy casting by means of which the entire engine may be supported and which will contain within its outlines the strongly reinforced explosive chambers, the gas conduits, gas controlling valves and cooling systems as well as the mountings for the other portions. The other portions of the engine casing are formed of relatively thin stock having a ruggedness and massiveness of material merely sufficient to withstand whatever incidental strains may be imposed on the part of the engine exterior to the heavy strain absorbing central casting.

Still another object of the invention is to provide an arrangement of parts which can be readily demounted for repair or replacement of parts.

Another object of the invention is to provide, in connection with the wabble plate power transmission elements, a relative light hollow construction capable of receiving the powerful thrusts of the pistons and capable of distributing impulses from the pistons on the angularly disposed portion of the wabble plate shaft and without distorting the designed construction and minimizing frictional losses which usually occur at this point in such types of engines.

Another object of the invention and still featuring simplicity of parts is to provide for lubricating the movable parts effectively and continuously with the utilization of the least possible power consumption for this purpose and the adaptation, as far as possible, of parts structurally necessary in the engine for the additional function of providing parts of the lubricating system.

Broadly, this latter object is attained by making certain of the power transmitting parts of hollow construction and drilling small oil conduits in those other parts which must necessarily be made of relatively solid construction.

Engines of this type impose severe torsional strains on the aligned as well as the angularly disposed portions of the driven shaft. The present disclosure contemplates a hollow shaft of unusual strain resisting strength and which is formed tubular for convenience in forging as well as providing for certain features of the lubricating system.

Various other objects and advantages of the invention will be in part obvious from an inspection of the accompanying drawings and in part will be more fully set forth in the following particular description of one form of mechanism embodying our invention, and the invention also consists in certain new and novel features of construction and combination of parts hereinafter set forth and claimed.

Referring to the accompanying drawings:—

Figure 1 is a sectional view taken axially of the driven shaft through one physical embodiment of the invention;

Figure 2 is an enlarged external view of the engine shown in Figure 1 with parts broken away to reduce the length of the showings and with attachment parts omitted;

Figure 3 is a transverse sectional view taken on the line 3—3 of Figure 1;

Figure 4 is an axial sectional view of a slightly modified form of the engine shown in Figure 1 enlarged to more clearly disclose details and with the left hand portion broken away to save space on the sheet; and Figure 5 is an axial sectional view of a slightly modified form of valve plunger spring housing.

In the following description and in the claims, parts will be identified by specific names for convenience of expression but they are intended to be as generic in their application to similar parts as the art will permit.

In the accompanying drawings, and referring particularly to the casing constituting the body portion of the engine, there is shown a relatively long, substantially cylindrical casing 10, having rounded ends, conforming generally to the working space of the wabble plate mechanism enclosed therein. The casing is formed of a centrally disposed casting 11, intermediate slightly tapered cylindrical spacing shells 12 at each longitudinal end of the casting and heads 13 in the form of hollow shells defining the round ends of the casting and all symmetrically disposed about the longitudinal axis $a$—$b$ of the cylindrical casing. In the following description lengthwise dimensions will be considered as parallel to this axis and radial or transverse directions will be considered as perpendicular to this axis.

The casting 11 is in the form of a hollow drum of relatively large external diameter compared to its width longitudinally and possesses a strength and rigidity of parts to withstand the force of the engine explosions which takes place within its outline. This central relatively heavy casting is intentionally constructed to withstand supporting strains and to localize therein practically all of the forces which might tend to produce vibration in an engine of this type. The casting is formed, in effect, of three long, circular walls disposed concentrically about the axis $a$—$b$ and including an inner wall 14, an intermediate wall 15, and an outer wall 16. The space between the intermediate wall and the outer wall is divided longitudinally of the axis $a$—$b$ to form a plurality of longitudinally extending explosive chambers 17 herein shown to be seven in number and disposed in a circle about the axis $a$—$b$ and each having a relatively small cross-sectional area perpendicular to the axis. The space between the intermediate wall 15 and the inner wall 14 is divided by means of a radial partition 18 to form two annular gas conducting passageways 19 and 20. The passageway 19 constitutes a means for conducting fuel to the several explosive chambers and is connected by means of a radially disposed pipe 21 projecting through the side of the casting, preferably at the bottom thereof, with a carbureter or other suitable fuel supplying device (not shown). The passageway 20 constitutes a conduit for discharging the burnt gases from the explosive chambers and is provided with a radially disposed exhaust pipe 22, leading therefrom through the side of the casting. These passageways have cross-sections sufficiently large to provide a volumetric capacity to conduct the gases necessary to supply the high powered, high speed engine illustrated. In the commercially perfected form of these engines, the gas passageways and controlling valves therefore hereinafter described are proportionately large compared to the dimensions of the engine. It will be understood that where a large fuel consumpton is necessary it will be found preferable to provide for a number of fuel intakes and exhaust pipes to meet the demands of the engine when functioning at high speed or under heavy loads.

The portions of the casting walls outlining the explosive chambers are provided with a plurality of water cooling chambers 23, preferably connected with some suitable form of water cooling radiator. Special effort is thus made to cool the hot portions of the engine and the other portions are air-cooled, thus tending to lighten the structure by omitting the water-jacketing of parts which do not develop high temperatures.

The portion of the intermediate wall 15, facing each of the explosive chambers 17, is provided longitudinally with a pair of ports, one port 24 providing communication between the fuel conducting passageway 19 and the explosive chamber, and the other port 25 similarly providing communication between the explosive chamber and the exhaust gas passageway 20.

It will be understood in the following description, in referring to the piston cylinders, pistons, power translating mechanisms between the pistons and the axially disposed driving shaft 26, the valves and cam control therefor, that the parts have a looking-glass symmetry on opposite sides of a perpendicular medial plane indicated by the line c—d intersecting the casting along the plane of the partition 18. Describing the parts at the left hand side of Figure 1, simply for convenience of identification, the port 24 is provided with an outwardly facing collar 27 ground on its outer-face to form a valve seat threaded into the casting and readily removed therefrom as hereinafter described.

The valve 24' is a radially movable poppet valve, normally rests upon said seat to close communication with the passageway 19 and is provided with a relatively long stem 28 which extends through the port and into the tubular valvular actuating mechanism containing space within the outlines of the inner wall 14. The stem is slidably mounted in a long guiding sleeve 29, in turn demountably positioned in a carrying sleeve 30, constituting an integral part of the casting and projecting outwardly and into the passageway 19 from the inner wall 14.

A bolt 31 extends axially through the stem, is provided on its inner end with a bearing head 32 and engages at its outer end in a wearing nut 33 countersunk centrally in the outer face 34 of the valve. This construction provides two rings of radially extending valves positioned in transverse planes on opposite sides of the plane c—d and positioned relatively close together so that the intake and discharge ports of each chamber 17 are disposed in juxta-position.

The outer wall 16 of the casing is provided with a ring of openings 35, one of said openings facing each of the ports 24. These openings have a diameter sufficiently large to permit ready access to the valve, its seat or guiding sleeve for the purpose of grinding the seat or removing the several parts.

The opening 35 is closed by means of a hollow, outwardly open pressed metal cap 36, designed to be screwed into the opening 35 and for this purpose is provided with slots 37 for receiving the screwing tool. The closing cap is provided centrally thereof with an outwardly extending plunger guiding sleeve 38 which provides the additional function of spacing a spring housing 39 outwardly beyond the outlines of the casting. A plunger 40 is slidably mounted in the sleeve 38 and is provided at one end with a spring engaging head 41, positioned within the housing 39, and at its opposite end with a blunt bearing end 42 designed to press centrally on the wearing nut 33 to force the valve onto its seat when released from the lifting action of the cam controlled valve unseating means hereinafter described. A coiled spring 43 is housed within the casing 39 and bears on the plunger head 41 to maintain the plunger in bearing engagement with the valve in all positions of the same. The valve housing 39 is provided with a plurality of outwardly extending fins 44 designed to cool the housing and thus withdrawing heat from the cap tend to air-cool the portion of the explosive chamber not cooled by the water-jacketed walls hereinbefore described. It will be understood that the closing cap, together with the spring pressed plunger and its housing, can be removed as a unit simply by unscrewing the cap thus providing ready access to any particular valve. The hollow construction of the cap and the outsetting of the spring housing tends to maintain the cap relatively cold so that it can be readily removed while the engine is inactive but the heat incidental to the explosions acts to expand the body of the cap exposed to the explosive chamber and thus tend to force the inner part of the cap into a gas-tight connection with the casting.

Piston cylinders 45 are screwed into longitudinal annular flanges 46, constituting an integral part of the casting and extending in alignment from opposite ends of each explosive chamber and in effect are continuations of the outer and inner walls. These piston cylinders are of materially greater dimensions diametrically than the depth of the explosive chambers and this construction provides a water cooled wall 47 at the inner ends of the piston cylinders. A water cooling chamber 48 back of the wall 47 coacts with the water cooling chamber 23 to maintain the active end of the piston cylinders cool as well as the explosive chambers themselves. From this construction it will be seen that there is at all times a definite explosive chamber in distinction from the relatively larger piston cylinders at opposite ends. The proportioning of the construction exteriorly of the inner wall 14 is governed to a great extent by the required diameter of the piston cylinders and as the explosive chambers need have but a limited cross-sectional dimension the longitudinal space thus formed between each pair of cylinders is economically utilized to accommodate the gas conducting passageways 19 and 20 with their associated valves. The piston cylinders are relatively thin metal open end shells with their outer ends positioned in and supported by a transverse end plate 49 and fastened in position by ring nuts 50 encircling the threaded outer ends of the cylinders and bearing against the plate.

The end plate is supported in a peripheral seat 51 formed on the inner side of heavy ring mounting 52, and is fastened thereto by through bolts 53. The plate and mounting are spaced from and supported by the central casting by means of the spacing shell 12. The space between each of the piston cylinders 45 and the encircling shell 12 provides air spaces 54 which tends to insulate the cylinders from the outside of the engine so that the engine radiates but little heat during its operation. Suitable ring packing 56 is positioned at each end of the shell 12 and between the same and the casting at one end and the end plate at the other end. By this construction it is possible to remove the ring mounting by withdrawing the bolts 53, then, by unscrewing the ring nuts 50, the end plate can be withdrawn, thus permitting the piston cylinders to be unscrewed from the main casting. The head shell 13 is seated against the outer face of the mounting 52 and is fastened thereto by exposed bolts 57. An inner thin lining shell 58 is fitted within the wall 14 of the casting and extends beyond opposite ends thereof in each direction part way along the length of the piston cylinders at each side of the engine. Near the left hand end of this lining sleeve there is fitted a relatively heavy band 59 constituting a bearing at one end for a plurality of cam rods 60 and having projecting from its outer face a relatively large bevel gear 61 constituting the stationary gear of a differential gear set 62, hereinafter more fully described in connection with the valve control mechanism. The shaft 26 has a central, straight portion 63 rotatably mounted adjacent opposite ends in radial and end thrust bearings 64, carried in the outer end of a centrally disposed shell 65, resembling in structure the piston cylinders and similarly mounted at one end in the casting wall 14 and at its outer end in the end plate 49. The bearings are fastened to the end plate by bolts 66 resembling the bolts 53. The bearing member at the right hand end of the device is fitted not only within the cylinder shell 65 but is also fitted within the end of the lining sleeve 58 to brace the same in the manner that the ring member 59 braces this lining sleeve at the left hand end.

As is usual with such engines the shaft 26 is formed symmetrically with the straight central portion 63, aligned end portions 67 and 68 concentric with reference to the axis $a$—$b$ and with two inclined portions 69 and 70 extending at the same angle and in opposite directions to each other across the axis $a$—$b$ and connecting respectively the ends of the straight portion 63 with end portions 67 and 68 as is usual in such types of wabbling plate transmission devices. In this case, however, the shaft is made solely of two pieces, a one-piece drop forging which includes the end portion 67 the inclined portion 69 and the main straight portion 63. The other part of the shaft is formed of the other end portion 18 inclined portion 70 and a fastening face plate 71. The shaft ports are connected by means of a pair of coacting face plates one of which is the face plate 71 formed integrally with and disposed at an angle to the inclined portion 70 of the shaft. The other face plate 72 constitutes a flange from one end of a sleeve 73 which is slid on the adjacent end of the straight portion 63 of the shaft and is held thereto by means of a ring nut 74 screwed onto the end of the shaft. Pins 75 let into the outer face of the nut and into the inner face of the plate 71 prevent relative rotary movement between the face plates. The face plates are also fastened together to prevent longitudinal movement by means of bolts 76 and a relatively long key 77 secures the sleeve 73 to the shaft along a relatively material length thereof and prevents rotary movement between the sleeve and shaft. The parts forming the shaft are made hollow to accommodate the lubricating feature of the invention hereinafter described and are made massive with relatively thick walls so as to transmit the heavy strains imposed thereon and at the same time maintain their true symmetrical position with reference to the axis $a$—$b$ under prolonged and severe working conditions. The central portion 63 is provided at opposite ends with closing plugs 78 which provide a closed lubricating reservoir 79 within the length of this straight portion in the embodiment of the invention disclosed in Figure 1.

The inclined portions or crank pins of the shaft are likewise formed of a hollow tubular structure and are closed at opposite ends by means of plugs 80 and 81, thus providing oil reservoirs 82 in each of the inclined crank pin portions of the shaft. Communication is provided between the lubricating reservoir 79 and the reservoirs 82 at opposite ends thereof by means of drillings, one of which 83 at the left end extends through the solid metal shank 84 connecting the straight portion 63 with the crank pin portion 69. The drilling 83 is aligned with a right angled drilling 85 in the adjacent plug 81. At the opposite end a similar straight drilling 86 extends angularly from the reservoir 79, through the side of the shaft 63, through the sleeve 73, and face plate 71. In the modified form of the invention shown in Figure 4 a lubricant conducting tube 87 is positioned axially in the shaft portion 70, has its opposite ends inserted in the closing plugs 80 and 81 at opposite ends thereof and by means of a drilling 88 in the plug 81 one end of the tube is connected with the drilling 86. At the opposite end the tube is connected with a supply intake passageway 89 drilled in the otherwise solid shaft end 68 and in the plug 80. This passageway 89 is designed to receive lubricant from a source of supply such as the oil pump 91 hereinafter described. In the form of the invention shown in Figure 1, the tube 92 corresponding to the tube 87 is formed integral with or fastened to the plug 81 and terminates in an open end intermediate the length of the reservoir 82 and adjacent the axis $a$—$b$. In this case the end portion 68 of the shaft is formed hollow and the lubricant is admitted to the central portion 63 of the shaft rather than through the external part of the end portion.

The tube 87 is provided with outlet vents 93 to permit the passage of the lubricant into the hollow portion of the crank pin 70. The crank pin is provided with outlet ports 94 for supplying the bearings 95 and 96 of the wabble plate construction, hereinafter described. At the opposite end of the engine a discharge tube 95' similar to the tube 92 is fitted at one end into the plug 81 to constitute a continuation of the drilled passage 85 and its opposite end 97 is opened to discharge into the shaft portion 69. The crank pin portion 69 is likewise provided with discharge vents 98 for lubricating the bearings for the wabble plate construction at this end of the engine.

In the form of the invention shown in Figure 4, the central portion 63 of the shaft is provided adjacent opposite ends with inset plugs 99 which constitute supports for opposite ends of an oil conducting tube 100 axially disposed in the central portion of the shaft and extending substantially for its entire length. This tube is of advantage in tending to reduce the amount of lubricant necessary when shafts having large tubular capacity are utilized.

The shank portions at opposite ends of the inclined crank pins are enlarged to extend outwardly beyond the outlines of the periphery of the pin to form abutments 101 at opposite ends thereof. A hollow, relatively light wabble plate construction of readily demountable and interfitting parts is fitted between the abutments 101 so as to be held against end play. This construction distinguishes from the heavy castings usually found in such locations in that it is a light, hollow casting but the material thereof disposed to withstand the severe strains imposed thereon by the thrust from the pistons without danger of buckling. This construction includes two frusto-conical shells 102 and 103 with their small ends projecting outwardly from each other and formed into relatively long hubs 104 engaging the abutments and with their hollow sides facing each other and spaced apart. The anti-friction bearings 95 and 96 are positioned between the hubs and the portions of the pin encircled thereby. By this construction it is possible to mount the thrust plate only at the ends of the crank pin, leaving the intermediate part free of frictional resistance and permitting the mounting of an end thrust bearing 105 in the lubricant containing space 106. The lubricant containing space enclosed by the shells is encircled by a relatively thick thrust ring 107 which includes a tubular wall 108, encircling the central portion of the crank pin and fitted at opposite ends in peripheral sockets 109 formed at the periphery of the shells 102 and 103. The ring acts to maintain the peripheries of the shells 102, 103 in spaced apart position on the crank pin and maintains the bearings 95 and 96 in engagement with these adjacent abutments. The space enclosed by the shells 102, 103 and the wall 108 forms the lubricant containing reservoir 106 which is fed from the vents 93 leading from the interior of the pin and in turn supplies the adjacent piston cylinders and the piston rod bearings. The end thrust bearing 105 is of a frusto-conical form, resembles the shells and extends between the central portion of the crank pin and the inner shell 102. This bearing is formed by means of an angle flange 110 formed on the pin slightly spaced outwardly from its center and engages a frusto-conical collar 111 supporting at its outer periphery 112 a ring 113. This ring faces a coacting ring 114 loosely fitted within the wall 108 and engaging one of the flanges 115 which forms the socket 109 of the shell 102. Ball bearings 116 are positioned between the rings which form runways therefor and are spaced from the crank pin and which are positioned relatively close to the wall 108. It will be noted that this end thrust bearing is positioned within the lubricant containing reservoir and this construction is of material importance when it is considered that the thrust of the pistons on the shaft is usually transmitted through the wabble plate with a decided tendency to distort the plate and thus destroy the effectiveness of the pre-designed organization. In this disclosure it will be noted that the powerful thrusts of the usually large pistons is largely transmitted through this end thrust bearing which can be made sufficiently rugged to transmit such strains and thus minimize the amount of material heretofore regarded as necessary in the other wabble plate mechanisms. The ring 107 exteriorly of the wall 108 is formed of outwardly extending shell walls 118, which are inclined towards each other and at the jointure of the walls is provided with a circle of spherical sockets 119 one for receiving each of the spherical heads 120 of the longitudinally disposed piston rods 121. Lubricant conducting tubes 122 extend from the wall 108 through the hollow space between the shell walls 118 and open into the socket 119 to supply lubricant from the reservoir 106 to the several piston end sockets. The shells 102 and 103 are made of two parts and slit longitudinally so as to facilitate their mounting upon the crank pin and the parts are fastened together by bolts 123. The pistons 124 are of the conventional trunk type, are reciprocatorily mounted in the piston cylinders 45 and are demountably connected by means of the spherical sockets 125 with the inner ends of the piston rods 121 as is usual in such constructions. It will be appreciated that the lubricant leaking from the exposed front end of the sockets 119 will be splashed by the rocking wabble plate into the open ends of the piston cylinders to lubricate the same as well as the sockets at the piston ends of the piston rods. The wabble plate will also act to splash this leaking lubricant into the adjacent shaft bearings. In this disclosure there is featured a disposition of piston rod connection between the piston and the wabble plate which will provide as far as possible a straight line thrust longitudinally between each piston and the part of the wabble plate facing the same. In the device illustrated the movement of the piston rod is limited to an angular play of about eight degrees from the axis of the piston.

Each explosive space is of the balance piston type and the piston cylinders are relatively large while the fuel compression and explosive chamber therebetween is of relatively small and constant volume capacity.

For the purpose of preventing rotary movement of the wabble plate construction about the crank pin the shell walls 118 are united at the lower end and enlarged to form a pivotal extension 126 extending perpendicular to the axis a—b as shown in Figure 3 and slidably mounted diametrically in a spherical bearing 127.

The sphere 127 is mounted in a socket 128 formed in an enlarged portion at the crotch 129 of a rocking fork 130. The rocking fork is of a substantial U-shaped form and at its free ends is defined by spherical members 131 which fit within similarly shaped cups 132 to form a universal joint between the ends of the fork and the enclosing shell head 13. The shell head is braced as shown in Figure 2 to withstand the push and pull at opposite ends of the fork and the cups 132 are bolted in place in a manner to permit ready demounting. The fork is formed star-shape in cross-section so as to obtain the maximum strain transmitting capacity with the use of the least possible amount of material. It will be understood that the wabble plate construction and its mounting disclosed herein is a development of the invention disclosed in the above identified application, Serial No. 219,634 and further these two disclosures are intended to be different physical embodiments of the common features of the invention.

The control mechanism for controlling the fuel admitting and exhaust-gas discharging valves include a relatively long and strong cam sleeve 133 rotatably mounted upon the straight portions 63 of the shaft and extends from the differential transmission 62 at one end practically to the shaft bearing at the opposite end thus utilizing all of the available space longitudinally. As is shown in our copending application Serial No. 135,798 this sleeve is provided with a plurality of longitudinally spaced apart peripheral bearing cams 134. The cams on opposite sides of the medial plane c—d are operatively connected to actuate respectively the fuel inlet controlling valves and the exhaust controlling valves on their respective sides in proper sequence to control the successive admission of fuel to the explosive chambers in their proper timed sequence and to correspondingly control the exhaust valves so as to exhaust the spent gases from the explosive chamber as is usual in such types of internal combustion engines.

The differential gear set 62 includes, in addition to the fixed gear 61, an active gear 135 facing the gear 61 and keyed to the shaft 63 so as to rotate therewith. The differential gear is completed by means of a pair of oppositely disposed idler gears 136 mounted upon transversely extending shafts 137 fixed to enlarged bosses 138 defining the driven end of the cam sleeve 133. The shafts 60 on opposite sides of the plane c—d are journalled at opposite ends and are each provided with two projections, one of which 139, is disposed in the path of travel of one of the cams 134 and the other projection 140 is disposed in position lapping the end of the valve bolt which is designed to be controlled thereby. The parts are so arranged that a cam 134 rotates into engagement with its corelated projections 139, the corresponding projection 140 acts through the valve to unseat the same against the tension of its reseating spring 41.

It is understood from this construction that the cam rod can be rotated at any desired speed relative to the speed of the shaft and that even though the valves are positioned in transverse planes and relatively close together and that a large number of cylinders are used, still the longitudinally spacing apart of the different cams along the available length of the cam shaft permits of sufficient space to accommodate the lever connections between each of the cams and the large number of closely positioned valves controlled thereby.

It is understood that each of the explosive chambers is provided with a spark plug 41 supplied from an external source of electric energy as is usual in such constructions. The form of engine herein disclosed provides convenient means at opposite ends for mounting certain attachments, such as the lubricant and water supplying pumps, spark control and the like. Two such forms of attachments are shown, one in Figure 1 and the other in Figure 4. In the disclosure shown in Figure 1 there is shown a combined distributor box and timer 142 for timing the firing of the several spark plugs mounted on the end shell so as to be readily demounted simply by removing the attached shell. In those cases where the attachment requires the application of power it may be operatively connected to be driven from the portion of the shafting which extends exteriorly of the adjacent head shell 13.

In Figure 4 the attachment includes the lubricant supplying pump 91 which discharges through the tubes 144 into the drilled conduit in the adjacent end of the shaft. The pump is supplied from the bottom of the end shells through a return pipe 145.

The attachment also includes a water pump 146 for supplying water received from a cooling radiator indicated diagrammatically by the water pipe 147 to the water jacketing spaces within the central casting.

In operation, it will be understood that the engine actuates as is usual with four cycle balance piston types of wabble transmission plate engines of the class illustrated. Succeeding explosions in the circle of cylinder acts simultaneously in opposite directions on each oppositely disposed pair of pistons and exert parallel thrusts upon the angularly disposed thrust plate which translates the reciprocatory movement of the pistons into rotary movement of the driven shaft.

By means of a device of this character it is possible to provide a simplified type of compact, internal combustion engine and the device in its mechanical organization responds to requirements of such an engine when designed for use as the power unit, in aeroplane constructions. To meet these requirements efforts are made to feature lightness in construction, the elimination of every ounce of metal which can be dispensed with and at the same time provide the necessary strength of structure to maintain the parts in the presence of the powerfully acting and relatively large pistons present. The thrusts from the pistons are caused to act on power transmitting parts designed to withstand the severe strains imposed thereon but the parts are so organized and designed as to minimize distorting tendencies and to localize the limited amount of material used, confining the same to those places where strains must be absorbed and transmitted. In other words the device features an economical disposition of metal. In aeroplane work it is vitally necessary that ready access should be provided to the different parts, even while the machine is in flight and particular attention has been given to this requirement in the development of the invention. Every element can be assembled from stock parts, every similar part is duplicated so as to be interchangeable and the parts can be assembled and demounted with the use of simple tools usually found about an engine.

While a water-cooling system has been found to be necessary in the illustrated embodiment of the invention, still this system has been reduced to a minimum further to assist in economizing weight and dependence is placed upon the air-cooling effect incidental to aeroplane travel to cool the major portion of the piston cylinders and parts associated therewith. Where hollow construction could be utilized in place of the usual solid castings such parts have been adopted and dependence placed upon properly angled relatively thin walls rather than on solidity of structure as will be particularly noted in connection with the wabble plate construction illustrated.

In providing for the lubricating system every effort has been made to reduce the amount of lubricant carried and parts which were found necessary in addition to the power transmission parts have been made as light as possible. In general the invention features a refinement in structural organization of an engine of the type disclosed rather than in any improvement in functional operation.

While we have shown and described, and have pointed out in the annexed claims, certain novel features of our invention, it will be understood that various omissions, substitutions and changes in the form and details of the device illustrated and in its operation may be made by those skilled in the art without departing from the spirit of the invention.

We claim—

1. In an internal combustion engine, the combination of a main central casting having a plurality of explosive chambers therein disposed concentrically about an axis, said casting having a ruggedness and massiveness sufficient to withstand strains incidental to the explosion forces generated in said chambers, said casing provided with a fuel passageway and with a discharge passageway both encircled by the explosive chambers, conduits leading from each of said passageways to the exterior of the casting, valves for controlling the flow of gases from the fuel passageway into the explosive chambers and for controlling the flow therefrom into the discharge passageway, a relatively light cylinder shell construction at opposite longitudinal ends of the casting including piston cylinders fitted to the casting and constituting continuations of each of the explosive chambers at opposite ends thereof and balanced pistons in said light shell cylinders exposed to the common explosive chamber.

2. In an internal combustion engine, the combination of a main central casting having a plurality of explosive chambers therein disposed concentrically about an axis, said casting having a ruggedness and massiveness sufficient to withstand strains incidental to the explosion forces generated in said chambers, said casting provided with a fuel passageway and with a discharge passageway both encircled by the explosive chambers, conduits leading from each of said passageways to the exterior of the casting, valves for controlling the flow of gases from the fuel passageway into the explosive chambers and for controlling the flow therefrom into the discharge passageway, a relatively light cylinder shell construction at opposite longitudinal ends of the casting including piston cylinders fitted to the casting and constituting continuations of each of the explosive chambers at opposite ends thereof, balanced pistons in said light shell cylinders exposed to the common explosive chamber, cylinder mountings for the ends of the piston cylinders opposite the ends mounted in the casting and a spacing shell at each end of the casting for supporting the adjacent cylinder mounting from the rugged casting.

3. In an internal combustion engine, the combination of a main central casting having a plurality of explosive chambers therein disposed concentrically about an axis, said casting having a ruggedness and massiveness sufficient to withstand strains incidental to the explosion forces generated in said chambers, said casting provided with a fuel passageway and with a discharge passageway both encircled by the explosive chambers, conduits leading from each of said passageways to the exterior of the casting, valves for controlling the flow of gases from the fuel passageway into the explosive chambers and for controlling the flow therefrom into the discharge passageway, a relatively light cylinder shell construction at opposite longitudinal ends of the casting including piston cylinders fitted to the casting and constituting continuations of each of the explosive chambers at opposite ends thereof, balanced pistons in said light shell cylinders exposed to the common explosive chamber, cylinder mounting for the ends of the piston cylinders opposite the ends mounted in the casting and a spacing shell at each end of the casting for supporting the adjacent cylinder mounting from the rugged casting, and a relatively light head shell at opposite ends supported from the adjacent cylinder mounting and coacting to close opposite ends of the engine.

4. In an internal combustion engine, the combination of a main central casting having a plurality of explosive chambers therein disposed concentrically about an axis, said casting having a ruggedness and massiveness sufficient to withstand strains incidental to the explosion forces generated in said chambers, said casting provided with a fuel passageway and with a discharge passageway both encircled by the explosive chambers, conduits leading from each of said passageways to the exterior of the casting, valves for controlling the flow of gases from the fuel passageway into the explosive chambers and for controlling the flow therefrom into the discharge passageway, a relatively light cylinder shell construction at opposite longitudinal ends of the casting including piston cylinders fitted to the casting and constituting continuations of each of the explosive chambers at opposite ends thereof and balanced pistons in said light shell cylinders exposed to the common explosive chamber, said casting provided with water cooling chambers therein for cooling the walls of the explosive chambers, said cooling chambers tending to lighten the weight of the rugged and relatively massive casting.

5. In an internal combustion engine, the combination of a main central casting having a plurality of explosive chambers therein disposed concentrically about an axis, said casting having a ruggedness and massiveness sufficient to withstand strains incidental to the explosion forces generated in said chambers, said casting provided with a fuel passageway and with a discharge passageway both encircled by the explosive chambers, conduits leading from each of said passageways to the exterior of the casting, valves for controlling the flow of gases from the fuel passageway into the explosive chambers and for controlling the flow therefrom into the discharge passageway, a relatively light cylinder shell construction at opposite longitudinal ends of the casting including piston cylinders fitted to the casting and constituting continuations of each of the explosive chambers at opposite ends thereof, balanced pistons in said light shell cylinders exposed to the common explosive chamber, cylinder mountings for the ends of the piston cylinders opposite the ends mounted in the casting and a spacing shell at each end of the casting and spaced thereform to form air spaces between the piston cylinders and the exterior side of the engine.

6. In an internal combustion engine of the balanced piston type, the combination of a casting having a plurality of open end explosive chambers therein disposed concentrically about an axis, said casting having a massiveness sufficient to withstand the explosions in said chambers, said casting providing a piston-chamber-defining wall at opposite longitudinal ends of each of said explosive chambers, said casting provided with water cooling chambers for cooling the walls of the explosive chambers and for cooling said piston-chamber-defining wall and relatively thin walled piston cylinders free of water jacketing means with an end of each cylinder facing one of the water cooled walls, projecting from the casting and open to its corresponding explosive chamber.

7. In an internal combustion engine of the balanced piston type, the combination of a plurality of explosive and expansion chambers disposed concentrically about an axis of reference and spaced therefrom, said chambers each including a pair of aligned piston cylinders and a common explosive chamber therebetween and with the inner wall of the explosive chambers spaced from the axis of a distance greater than the corresponding distance of the inner wall of the piston cylinders thereby to form an annular space between the piston cylinders, means providing two annular passageways within said space, one of said passageways constituting means for supplying fuel to the several explosive chambers and the other passageway constituting a means for conducting the spent gas from said explosive chambers, said means including an end wall to each piston cylinder also provided with a water-cooling chamber disposed between the end of the piston cylinders and the adjacent passageway thereby to cool one end of the piston cylinders.

8. In an internal combustion engine of the balanced piston type, the combination of five major parts disposed longitudinally of and encircling a centrally disposed axis of reference, said parts including a central part containing a plurality of open end explosive chambers disposed in a circle about the axis, and means substantially contained within the outlines of said central part for controlling and firing the charge in the chambers, said central part being relatively massive and capable of withstanding the strains imposed thereon by the explosion in the several chambers, the two intermediate parts at each end of the casting being relatively light and not intentionally disposed to withstand severe strains and constituting piston cylinders supported from the casting and open to the explosive chambers, pistons in said cylinders arranged in balanced pairs and with each pair open to its common explosive chamber, the end major parts being also relatively light and hollow and constituting closing heads for the opposite ends of the engine, a driven shaft extending along said axis and means within each of said hollow end parts for translating the reciprocatory movement of the pistons constituting the adjacent set into rotary movement of the shaft.

9. In an internal combustion engine of the balanced piston type, the combination of five major parts disposed longitudinally of an axis of reference, said parts including a central part containing a plurality of explosive chambers, each open at opposite ends and disposed about the axis and means including valves contained within the outlines of said central part for controlling and firing the charge in the chambers, said central part being relatively massive and capable of withstanding the strains imposed thereon by the explosions, the two intermediate parts at each end of the casting being of relatively light construction and including piston cylinders supported from the casting at one end and open at this end to the explosive chambers, pistons in said cylinders, the end major parts being also relatively light and hollow and constituting closing heads for the opposite ends of the engine, a shaft extending along said axis, means within each of said end parts for translating the reciprocatory movement of the adjacent pistons into rotary movement of the shaft and friction means mounted in each of the end head parts and constituting out-bearings for journalling the shaft.

10. In an internal combustion engine of the balanced piston type, the combination of five major parts disposed longitudinally of an axis of reference and coacting to form a mechanism containing casing, said parts including a central part containing a plurality of open end explosive chambers disposed about the axis and means for controlling and firing the charge in the chambers, said central part being relatively massive compared to the other major parts and capable of withstanding the strains imposed thereon by the explosions, the two intermediate major parts at each end of the casting being relatively light and including open end piston cylinders supported at one end from the casting and open through the supported end to the explosive chambers, pistons in said cylinders, the end major parts constituting closing heads for the opposite ends for the engine, a shaft extending along said axis, a wabble-plate construction housed within each of said end parts for translating the reciprocatory movement of the adjacent pistons into rotary movement of the shaft, anti-friction means mounted in each of the end head parts constituting out-bearings for journalling the shaft at opposite ends of the casing and other anti-friction means carried by the intermediate parts and constituting in-bearings for the shaft.

11. In an internal combustion engine of the balanced piston type, the combination of a central casting, a driven shaft extending axially therethrough, said casting provided with a plurality of explosive chambers encircling said shaft and spaced therefrom, a pair of co-axially disposed piston cylinders having their ends fitted in said central casting and open to said explosive chamber at opposite ends thereof, pistons mounted in said cylinders, a driving connection between said pistons and said shaft, a gas passageway disposed within the circle of said explosive chambers and positioned between the ring of chambers and said shaft, radially extending valves for controlling the gas flow between the passageway and the explosive chambers, and mechanism for actuating said valves disposed between the shaft and the valves and operatively connected to the shaft to be driven thereby, the outer wall of said casting opposite one of said explosive chambers and between the ends of the piston cylinders having an opening facing one of the valves therein and having a dimension to permit the valve to be withdrawn from its seat through said opening without affecting said valve actuating mechanism nor the pistons.

12. In an internal combustion engine of the balanced piston type, the combination of a casting, a driven shaft extending therethrough, said casting provided with a plurality of explosive chambers encircling said shaft and spaced therefrom, a pair of aligned piston cylinders with their adjacent ends screwed into the casting and open to said explosive chamber at opposite ends thereof, pistons mounted in said cylinders, a driving connection between said pistons and said shaft, said casting provided with a gas passageway disposed within the circle of said explosive chambers and positioned between the ring of chambers and said shaft, radially extending valves guided in said casting for controlling the gas flow between the passageway and the explosive chambers, and mechanism for actuating said valves disposed between the shaft and the valves and operatively connected to the shaft to be driven thereby.

13. In an internal combustion engine, of the balanced piston type, the combination of a central casting, a driven shaft extending therethrough, said casting having a plurality of explosive chambers spaced about said shaft, radially movable valves opening into said chambers on the inner side thereof, said casting including a ring encircling the shaft and providing mountings for said valves, valve actuating mechanism driven from the shaft for successively unseating said valves, said valves being free of any attaching connection with the unseating mechanism whereby the valve can be withdrawn readily from the mechanism and said explosive chamber provided with an opening at opposite ends for receiving piston cylinder and for permitting ready access to the valve.

14. In an internal combustion engine, of the balanced piston type, the combination of a casting provided with an annular gas conducting passageway disposed in a plane perpendicular to an axis of reference and a plurality of explosive chambers encircling said passageway and extending parallel to said axis, opposite ends of said explosive chambers being threaded to receive piston cylinders, a ring of ports opening from said passageway into said chambers, outwardly facing removable valve seats fitted in said ports, poppet valves normally disposed on said seats, water cooled means forming part of the casting for guiding the valves during their movements radially of said axis, said casting provided on its outer side with a ring of openings, with an opening facing each of said valves and its seat, said openings having cross sections sufficient to permit the removal of the valves and to permit ready access to the valve seat to regrind or remove the same.

A copy of application Serial No. 349,652, filed January 5th, 1920 has been read and we hereby sign the same this 1st day of May, 1920.

ALBERTO LLEO.
CLAUDIO BARADAT.